Patented Nov. 1, 1949

2,486,539

UNITED STATES PATENT OFFICE 2,486,539

CONVERSION OF BETA-, GAMMA-, AND DELTA-TOCOPHEROL TO ALPHA-TOCOPHEROL

Leonard Weisler, Rochester, N. Y., assignor to Distillation Products, Inc., Rochester, N. Y., a corporation of Delaware No Drawing. Application July 19, 1946, Serial No. 684,769

19 Claims. (Cl. 260—333)

This invention relates to an improvement in the vitamin art, and in particular, to a process for converting any tocopherol other than alpha, such as beta-, gamma-, and delta-tocopherol, and also the esters of tocopherols other than alpha, into a product having higher vitamin E activity, in particular a higher curative power for sterility in the depleted rat. Delta-tocopherol is a newly discovered natural compound disclosed in Baxter, Stern and Weisler application, Serial No. 684,770, of this date.

Using the accepted system of numbering carbon atoms, it is known that alpha-tocopherol has methyl groups in the 5, 7, and 8 positions. Beta-tocopherol is the same except that the methyl group in the 7 position is replaced by a hydrogen atom. Gamma-tocopherol is the same except that the methyl group in the 5 position is replaced by a hydrogen atom. The best evidence now available indicates that delta-tocopherol is the same as alpha-tocopherol except that hydrogen atoms are substituted for the methyl groups both in the 5 and 7 positions. It is also known that beta-, gamma-, and delta-tocopherol have lower antisterility activity than alpha-tocopherol. In spite of these facts, no one has previously devised a suitable method for the conversion to alpha-tocopherol of other tocopherols. Such conversion would be of importance since tocopherols other than alpha-tocopherol occur naturally in large amounts.

Esters of tocopherols have substantially the same vitamin E activity as an equivalent molecular weight of tocopherols. The conversion of the esters of tocopherols other than alpha into esters of alpha-tocopherol can be satisfactorily carried out by my invention.

This invention, therefore, has for its object to provide a procedure for conversion of other tocopherols and the esters thereof into the corresponding alpha-tocopherol compound. Another object is to introduce substituent groups wherever the 5, 7, and 8 positions of tocopherols and the esters thereof are occupied only by hydrogen atoms and thus prepare substances having higher antisterility activity. A still further object is to provide an improved procedure for substituting methyl groups for hydrogen atoms in the 5, 7, and 8 positions of tocopherols and the esters thereof, so that these compounds are converted into alpha-tocopherol or its esters. Another object is to provide new vitamin E intermediates. Still another object is to improve the state of the art. Other objects will appear hereinafter.

These and other objects are accomplished by my invention which includes introducing substituents into the 5, 7, and/or 8 positions of the tocopherols and the esters thereof.

In the following description I have set forth several of the preferred embodiments of my invention but it is to be understood that they are given by way of illustration and not in limitation thereof.

This invention involves the replacement of any aromatic hydrogen atoms in the 5, 7, and/or 8 positions of the tocopherols and the esters thereof by substituents and is accomplished in the case of methyl groups, for instance, by the reaction of the tocopherol compound with an aqueous solution of formaldehyde (40%) in the presence of hydrogen chloride. This results in the substitution of chloromethyl groups for any aromatic hydrogen atoms in the 5, 7, and/or 8 positions. These chloromethyl groups are then converted to methyl groups by a reduction procedure, such as the Clemmensen procedure, zinc dust and hydrochloric acid or catalytic hydrogenation under moderate pressure such as 50 pounds with a hydrogenation catalyst such as nickel or palladium. The introduction of substituents can be accomplished using hydrogen halides other than hydrogen chloride, such as hydrogen bromide or iodide. Instead of using Formalin, a polymer of formaldehyde, such as paraformaldehyde, may be used to introduce the chloromethyl group. Chloromethyl ether, prepared by introducing hydrogen chloride gas into a mixture of paraformaldehyde and methanol, may also be used. Similarly, dimethyl formal and hydrogen halide may be used. Other groups than methyl may be introduced using other reactants of the type mentioned. Thus, ethyl groups can be introduced using paraldehyde instead of formaldehyde or diethyl formal instead of dimethyl formal, or propyl groups may be introduced using propionaldehyde. Aryl groups can be introduced using benzaldehyde. It is to be understood that all such reactions which involve introduction of alkyl, aryl, alkaryl, or aralkyl groups shall be included within the scope of my invention and within the meaning of the term "haloalkylation" as used herein.

In the chloromethylation of tocopherols I have found that the best conditions consist of treating a 5–10% ethereal solution of the oil containing the tocopherols with a 3–4 mole excess of aqueous Formalin and concentrated hydrochloric acid at room temperature. The mixture is stirred vigorously while a small stream of hydrogen chloride gas is introduced into the mixture.

In ordinary commercial practice, it is a mixture of tocopherols or the esters thereof which is converted to alpha-tocopherol. Pure beta-, gamma-, and delta-tocopherol solutions or the esters thereof can also be converted to alpha-tocopherol. Ethyl or propyl groups can be substituted for aromatic hydrogen atoms in the 5, 7, and 8 positions in solutions containing mixtures of beta-, gamma-, and delta-tocopherol or their esters as well as in solutions containing the pure substances.

Tocopherol esters may be prepared by reacting tocopherols with an acid halide, such as acetyl chloride, in the presence of a solvent, such as pyridine. Tocopherol acetates may also be prepared by reacting tocopherols with acetic anhydride in the presence of a solvent, such as pyridine.

Only the tocopherol nucleus is involved in the conversion of lower tocopherol esters to alpha-tocopherol esters. The length of the ester chain does not materially affect the reaction.

The Mannich reaction may be used to effect conversion of lower tocopherols and their esters to alpha-tocopherol and its esters but in lower yields. This reaction consists in the condensation of ammonia or a primary or secondary amine with formaldehyde and a compound containing a hydrogen atom of pronounced activity. The condensation results in the replacement of the active hydrogen atom by an aminomethyl or substituted aminomethyl group. To introduce the methyl group, the amino or substituted amino group can be removed by high pressure catalytic hydrogenation. Thus, the lower tocopherols, dissolved in a solvent such as absolute ethyl alcohol, may be treated with an amine such as piperidine and an aldehyde, such as paraformaldehyde, and a very small amount of concentrated hydrochloric acid to catalyze the reaction. The mixture is refluxed for several hours to produce a product in which an alkylene piperidine grouping, such as methylene piperidine, has replaced any aromatic hydrogen atoms in the 5, 7, and 8 positions. This grouping can be catalytically hydrogenated to the alkyl grouping, e. g., methyl groups, by heating to 165° C. at 2000 pounds per square inch pressure in an atmosphere of hydrogen and the presence of a catalyst, such as copper chromite.

Acetaldehyde may be substituted for paraformaldehyde in the Mannich reaction to give an ethylene piperidine grouping in place of aromatic hydrogen atoms in the 5, 7, and 8 positions. Similarly, the use of propionaldehyde would result in propylene piperidine groups in place of aromatic hydrogen atoms in the 5, 7, and 8 positions. Catalytic hydrogenation under the conditions mentioned above would then give the respective ethyl or propyl groups in the 5, 7, and 8 positions previously occupied by aromatic hydrogen atoms.

Typical examples of the conversion of other tocopherols and their esters to the corresponding alpha-tocopherol compounds are as follows:

*Example 1*

A pure preparation of natural beta-tocopherol (0.65 g., 100% by Emmerie-Engel assay) was dissolved in ether (25 cc.) in a three-necked flask equipped with a stirrer. While the temperature of the solution was kept at 30° by a water bath, 5 cc. of concentrated hydrochloric acid and 0.4 cc. of aqueous 40% Formalin was added and hydrogen chloride gas bubbled through the mixture for 25 minutes. The mixture was reduced by the cautious addition of 1.0 g. of zinc dust over a period of 30 minutes.

The reaction mixture was worked up by adding water and washing the ether solution four times with water to remove zinc chloride and acid, and then filtered through Doucil (10 g.) to remove the last traces of zinc chloride. Removal of the solvent left a light yellow oil (0.70 g.) which had an Emmerie-Engel potency of 76%.

*Proof of structure.*—In order to prove the synthesis of alpha-tocopherol, the acid succinate ester which has been previously characterized (J. A. C. S. 65, 922 (1943)), was prepared and isolated in the following manner:

The concentrate was esterified by heating it at 90° in pyridine (3 cc.) with succinic anhydride (1 g.) for 4 hours. The reaction mixture was then poured on a mixture of ice and 5% aqueous hydrochloric acid and extracted with ether. After washing with 5% acid and water the solution was dried and the solvent distilled, leaving 0.85 g. of crude acid succinate.

Further purification was accomplished by solution of the crude succinate in ethyl alcohol (20 cc.) and neutralization with 10% alcoholic KOH, litmus being used as an outside indicator. The alcohol solution was adjusted to 83% by the addition of water and the solution then extracted with petroleum ether (Skellysolve F) saturated with 83% ethyl alcohol. Under these conditions the tocopherol acid succinate remained in the alcohol solution while the non-acidic materials were extracted in the petroleum ether. After acidification of the alcohol extract the tocopherol acid succinate was extracted with ether and recovered to give 0.64 g. of purified product.

Crystallization was accomplished by dissolving the ester in Skellysolve F (8 cc.) and cooling the solution to 0°. The white solid which separated was recrystallized at room temperature from petroleum ether and melted at 76–77° (0.48 g.), which is the melting point of alpha-tocopherol succinate. A mixed melting point determination showed no depression. The absorption maximum and extinction coefficient of the synthesized preparation $$(E_{1\,cm.}^{1\%}\ (286\ m\mu) = 38)$$

were also identical with that of alpha-tocopherol acid succinate.

*Example 2*

3.3 g. of a tocopherol concentrate prepared by molecular distillation of soybean oil (62% tocopherol by the Emmerie-Engel assay, approximately 10% alpha-, 60% gamma-, and 30% delta-tocopherol by chemical assay) was dissolved in 75 cc. of ether. Paraformaldehyde (0.4 g.) and zinc chloride (0.4 g.) were added and a vigorous stream of hydrogen chloride gas passed into the suspension for fifteen minutes at room temperature and the mixture allowed to stand overnight. The mixture was washed with water, dried and evaporated under vacuum. The resulting oil assayed for 46% tocopherol and gave a positive chloride test after a sodium fusion. It was then reduced with zinc-mercury amalgam and concentrated hydrochloric acid in ethanol and then vacuum distilled after separation from the reaction mixture. Two distillate fractions were obtained which contained 22.5% of the original tocopherol. A portion of the second distillate was treated with succinic anhydride and pyridine and 0.1 g. of alpha-tocopherol acid succinate was isolated and identified in the manner described in Example 1.

*Example 3*

To a solution of 0.5 g. of gamma-tocopherol concentrate (62.5% by Emmerie-Engel assay, approximately 10% alpha-, 60% gamma-, and 30% delta-tocopherol by chemical assay, concentrated from a commercial vitamin E concentrate by chromatography) in 20 cc. of ether, 1 cc. of aqueous Formalin and 5 cc. of concentrated hydrochloric acid were added. The mixture was vigorously stirred and hydrogen chloride gas introduced for thirty minutes at room temperature. The reaction was worked up as above and the resulting oil reduced. The final product assayed 55.4% tocopherol and when succinated, 0.13 g. of alpha-tocopherol acid succinate was isolated and identified; yield, 34%.

*Example 4*

A solution of 0.667 g. of pure gamma-tocopherol (originally isolated from soybean oil) was treated as in Example 3. As a final product 0.2 g. of pure alpha-tocopherol acid succinate was isolated and identified; yield, 24.2%. A biochemical assay of the succinate by the Evans resorption test indicated that it was as active in preventing sterility as pure alpha-tocopherol using alpha-tocopherol acetate as the standard. In Examples 3 and 4, the conversion is undoubtedly better than the yields indicate, since it is difficult to succinate and crystallize quantitatively.

*Example 5*

An ethereal solution of 3.35 g. of gamma-tocopherol concentrate (62% by Emmerie-Engel assay) was treated with 2 cc. of chlormethyl ether under reflux for 1½ hours. The ethers were removed under nitrogen and the resulting oil reduced and distilled in a small pot still. A distillate was obtained which weighed 1.4 g. and assayed for 50% tocopherol. The oil was found to contain 87% alpha-tocopherol by chemical assay and 72% by biological assay using natural alpha-tocopherol acetate as the standard.

*Example 6*

A 20% ether solution of 45 g. of tocopherol concentrate (33% total tocopherols by Emmerie-Engel assay consisting of approximately 10% alpha-, 60% gamma-, and 30% delta-tocopherol by chemical assay) concentrated from soybean oil by molecular distillation was treated with 30 cc. of concentrated hydrochloric acid and 6 cc. of aqueous Formalin and stirred vigorously for 130 minutes. At the end of this time, 10 g. of zinc powder was slowly added directly to the reaction mixture and reduction allowed to proceed for 30 minutes. The ether layer was then separated, washed, dried and evaporated to yield a light yellow oil (45.1 g.) with an Emmerie-Engel potency of 32.4%. Molecular distillation of the oil gave a recovery of 83.5% of material which distilled in the vitamin E range and which assayed chemically for 37.6% gamma-tocopherol and 62.4% alpha-tocopherol.

*Example 7*

A substantially pure preparation of delta-tocopherol (0.83 g., 99.5% by Emmerie-Engel assay) was dissolved in ethyl ether (31 cc.) in a three-necked flask equipped with a stirrer. While the temperature of the solution was kept at 30° by a water bath, hydrogen chloride gas was bubbled through the solution for 5 minutes from a cylinder, then aqueos HCl (6.2 cc.) was added together with 35% Formalin solution (5 cc.). The mixture was stirred for 15 minutes with HCl gas passing through. A test on a sample of the solution then indicated that chloromethylation was virtually complete (as determined by loss of ability to couple with diazotized dianisidine to give a red color).

The chloromethyl compound was then reduced with zinc dust (2 g.) by stirring at room temperature for 20 minutes. The ether solution was washed four times with water to remove zinc salts and filtered through Doucil (12 g.) to remove the last traces of zinc chloride. The presence of this substance causes, on heating, polymerization of tocopherols to substances inactive as vitamin E. The solvent was then removed, leaving a yellow oil (0.82 g.), estimated to contain 79% tocopherol in the ratio of 89% alpha-tocopherol to 11% unchanged delta-tocopherol. The structure was proved by preparation of the acid succinate ester as outlined in Example 1. A biochemical assay of the succinate by the Evans resorption test indicated that it was as active in preventing sterility as pure alpha-tocopherol using alpha-tocopherol acetate as the standard.

*Example 8*

10 g. of soybean tocopherol concentrate (58.7% potency by Emmerie-Engel assay, 95% gamma-tocopherol by chemical assay) was dissolved in 75 cc. of ether and 1.0 g. of acetaldehyde added. Under stirring, HCl gas was bubbled through the mixture at room temperature (25°) for 1½ hours. The chloroethylated compound was reduced by adding 16.5 g. of a 10% Zn-amalgam over a period of ½ hour and stirring the mixture for an additional hour. The mixture was extracted with ether, washed with water to neutrality, and dried over sodium sulfate. Evaporation of the ether gave a light brown oil (38% potency by E-E, 75% 5-ethyl-7, 8 dimethyl tocol by chemical analysis) representing a yield of 49%. This material was concentrated by molecular distillation and distilled at 140–180° C. at 7 microns.

*Example 9*

200 g. of a soybean tocopherol concentrate (50% combined tocopherols by the Emmerie-Engel assay, approximately 10% alpha, 60% gamma, and 30% delta tocopherol by chemical assay) was treated with 104 g. of acetic anhydride and 50 g. of pyridine and heated for one hour on the steam bath. The reaction mixture was dissolved in 2 liters of ether, washed three times with 5% HCl, three times with water, and dried over sodium sulfate. Evaporation of the solvent gave 109 g. of tocopherol acetate concentrate.

40 g. of the above prepared concentrate was placed in a three-neck round bottomed flask equipped with a mechanical stirrer. To the oil 60 cc. of Formalin and 80 cc. of concentrated hydrochloric acid was added. While the temperature of the reaction mixture was kept at 80° C., hydrogen chloride gas was passed through the mixture with stirring for three hours. The oil was then extracted with ether, worked free of acid, and dried over sodium sulfate. Evaporation of the solvent under vacuum left a light red oil (43 g.). When a sample was treated with alkali, a copious test for chloride ion was obtained indicating the introduction of the chloromethyl group.

The chloromethylated oil was dissolved in 300 cc. of ether and treated with 60 cc. of concentrated hydrochloric acid and 25 g. of zinc dust for one hour. Separation of the reduced product gave 40.5 g. of a light yellow oil which was identified as an alpha tocopherol acetate concentrate by saponification to the free tocopherol followed by succination and isolation of alpha tocopherol succinate as in Example 1.

Example 10

0.5 g. of pure gamma-tocopherol in 5 cc. of absolute alcohol was treated with 0.1 g. piperidine, 0.1 g. paraformaldehyde and 3 drops of concentrated hydrochloric acid. The resulting mixture was heated under reflux for two hours. Separation of the oil from the mixture produced a light brown pasty mass (0.55 g.). A coupling determination using diazotized diansidine showed that a reaction had occurred at position 5.

This product was hydrogenated at 2000 lbs. pressure over copper chromite catalyst in alcohol as a solvent for three hours. Chemical tests indicated that piperidine had been regenerated. The reduced product was isolated and succinated with succinic anhydride in pyridine. From the succinated mixture 0.1 g. of alpha-tocopherol succinate was isolated as in the previously described examples.

Example 11

To a solution of 18.2 g. of tocopherol concentrate (55% by Emmerie-Engel assay, approximately 10% alpha-, 30% delta-, 60% gamma-tocopherol) in 182 cc. of isopropyl ether, 2.80 cc. of benzaldehyde was added and the mixture stirred vigorously while hydrogen chloride gas was bubbled through the solution for one hour. The temperature of the reaction was regulated at 30° C. by a water bath.

The reaction mixture was then reduced by the addition of 20 g. of zinc dust over a period of 1¼ hours at 30° C. The oil was separated as an ether extract by the addition of water, the ether extract washed three times with water, and passed through a column of Doucil for final purification. Evaporation of the solvent left a light red oil (20.45 g., 42.4% E-E potency, 87% yields). An analysis by coupling with o-dianisidine showed that only 9% of the potency was due to gamma- and delta-tocopherols.

The oil was distilled in a molecular still and a distillate obtained (potency 45%) in overall yield of 78.5%. The distillate was a light yellow viscous oil which distilled at 180° at 7 microns. It analyzed for 6% gamma- and delta-tocopherol.

This application is a continuation in part of my application 589,927 filed April 23, 1945, which was co-pending at the time the present application was filed but which subsequently has been abandoned.

What I claim is:

1. A method of treating a tocopherol compound having at least one aromatic hydrogen atom in the nucleus and being selected from the class consisting of beta-tocopherol, gamma-tocopherol, delta-tocopherol, and esters thereof which comprises replacing said hydrogen atom with a halohydrocarbon group, and reducing said halohydrocarbon group to the corresponding hydrocarbon group.

2. A method of treating a tocopherol compound having at least one aromatic hydrogen atom in the nucleus and being selected from the class consisting of beta-tocopherol, gamma-tocopherol, delta-tocopherol, and esters thereof, which comprises replacing said hydrogen atom with a haloalkyl group by subjecting said compound to a haloalkylation reaction, and reducing said haloalkyl group to the corresponding alkyl group.

3. A method which comprises treating a tocopherol compound having at least one aromatic hydrogen atom on the nucelus and selected from the class consisting of beta-tocopherol, gamma-tocopherol, delta-tocopherol, and esters thereof with an aldehyde and a hydrogen halide, and reducing the resulting substituent halohydrocarbon group in the position of said aromatic hydrogen atom to the corresponding hydrocarbon group.

4. A method of increasing the vitamin E biological activity of a tocopherol compound having at least one aromatic hydrogen atom in the nucleus and being selected from the class consisting of beta-tocopherol, gamma-tocopherol, delta-tocopherol, and esters thereof which comprises replacing said aromatic hydrogen atom with a halomethyl group by subjecting said compound to halomethylation, and reducing said halomethyl group to a methyl group.

5. A process of increasing the vitamin E biological activity of a tocopherol compound having at least one aromatic hydrogen atom in the nucleus and selected from the class consisting of beta-tocopherol, gamma-tocopherol, delta-tocopherol, and esters thereof which comprises replacing said aromatic hydrogen atom with a methyl group by chloromethylating and reducing said compound.

6. A method of treating delta-tocopherol which is characterized by having aromatic hydrogen atoms in the 5 and 7 positions thereof which comprises introducing a methyl group into at least one of said positions by chloromethylating and reducing said delta-tocopherol.

7. A process of increasing the vitamin E biological activity of gamma-tocopherol which comprises introducing a methyl group into the 5 position of said gamma-tocopherol by halomethylating and reducing said gamma-tocopherol.

8. A process of increasing the vitamin E biological activity of beta-tocopherol which comprises introducing a methyl group into the 7 position of said beta-tocopherol by halomethylating and reducing said beta-tocopherol.

9. A process of increasing the vitamin E biological activity of delta-tocopherol which comprises introducing methyl groups into the 5 and 7 positions of said delta-tocopherol by halomethylating and reducing said delta-tocopherol.

10. As a new chemical compound, a substance having the formula

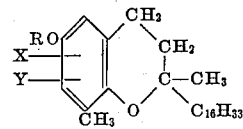

wherein R is a member selected from the class consisting of hydrogen and acyl groups; X is a member selected from the class consisting of methyl and haloalkyl groups; and Y is a haloalkyl group.

11. As a new chemical compound, a substance having the formula

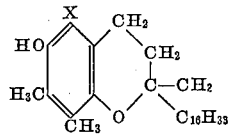

wherein X is a haloalkyl group.

12. As a new chemical compound, a substance having the formula

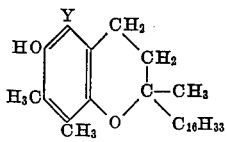

wherein Y is a halomethyl group.

13. As a new chemical compound, a substance having the formula

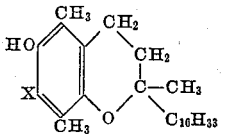

wherein X is a haloalkyl group.

14. As a new chemical compound, a substance having the formula

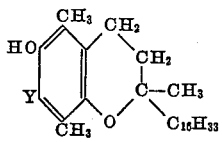

wherein Y is a halomethyl group.

15. As a new chemical compound, a substance having the formula

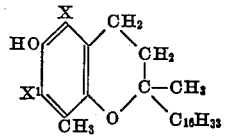

wherein X and $X^1$ are haloalkyl groups.

16. As a new chemical compound, a substance having the formula

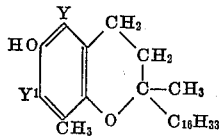

wherein Y and $Y^1$ are halomethyl groups.

17. A process of increasing the vitamin E biological activity of gamma-tocopherol which comprises introducing a methyl group into the 5 position of said gamma-tocopherol by chloromethylating and reducing said material.

18. A process of increasing the vitamin E biological activity of beta-tocopherol which comprises introducing a methyl group into the 7 position of said beta-tocopherol by chloromethylating and reducing said material.

19. A process of increasing the vitamin E biological activity of delta-tocopherol which comprises introducing methyl groups into the 5 and 7 positions of said delta-tocopherol by chloromethylating and reducing said material.

LEONARD WEISLER.

REFERENCES CITED

The following references are of record in the file of this patent:

UNITED STATES PATENTS

| Number | Name | Date |
| --- | --- | --- |
| 1,727,682 | Tschunkur et al. | Sept. 10, 1929 |

FOREIGN PATENTS

| Number | Country | Date |
| --- | --- | --- |
| 526,884 | Great Britain | Sept. 27, 1940 |

OTHER REFERENCES

Smith et al.: J. Am. Chem. Soc. 64, 524–527 (1942).